(12) United States Patent
Smith et al.

(10) Patent No.: US 10,896,534 B1
(45) Date of Patent: Jan. 19, 2021

(54) AVATAR STYLE TRANSFORMATION USING NEURAL NETWORKS

(71) Applicant: Snap Inc., Santa Monica, CA (US)

(72) Inventors: Harrison Jesse Smith, Oakland, CA (US); Chen Cao, Los Angeles, CA (US); Yingying Wang, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 5 days.

(21) Appl. No.: 16/135,911

(22) Filed: Sep. 19, 2018

(51) Int. Cl.
  *G06T 13/40* (2011.01)
  *H04L 12/58* (2006.01)
  *G06N 3/08* (2006.01)
  *G06N 20/00* (2019.01)

(52) U.S. Cl.
  CPC .............. *G06T 13/40* (2013.01); *G06N 3/08* (2013.01); *G06N 20/00* (2019.01); *H04L 51/10* (2013.01)

(58) Field of Classification Search
  CPC .......... G06T 13/40; G06N 20/00; G06N 3/08; H04L 51/10
  See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

Holden, Daniel, "A Deep Learning Framework for Character Motion Synthesis and Editing", ACM Transactions on Graphics, vol. 5, Issue 4, (Jul. 2016), 11 pgs.

(Continued)

*Primary Examiner* — King Y Poon
*Assistant Examiner* — Vincent Peren
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for transforming a motion style of an avatar from a first style to a second style. The program and method include: retrieving, by a processor from a storage device, an avatar depicting motion in a first style; receiving user input selecting a second style; obtaining, based on the user input, a trained machine learning model that performs a non-linear transformation of motion from the first style to the second style; and applying the obtained trained machine learning model to the retrieved avatar to transform the avatar from depicting motion in the first style to depicting motion in the second style.

19 Claims, 11 Drawing Sheets

(56) References Cited

U.S. PATENT DOCUMENTS

| | | |
|---|---|---|
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Watanabe |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0184355 A1* | 8/2006 | Ballin .................. G06F 3/011 704/8 |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0042404 A1* | 2/2016 | Joshi ................ G06Q 30/0272 705/14.55 |
| 2016/0134840 A1 | 5/2016 | McCulloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen Dennis et al. |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |

(56) References Cited

U.S. PATENT DOCUMENTS

| | | |
|---|---|---|
| 2019/0057616 A1 | 2/2019 | Cohen et al. |
| 2019/0172243 A1* | 6/2019 | Mishra ................ G06K 9/4628 |
| 2019/0188920 A1 | 6/2019 | Mcphee et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

Xia, Shihong, "Realtime Style Transfer for Unlabeled Heterogeneous Human Motion", CM Transactions on Graphics, vol. 34, Issue 4, (Aug. 2015), 10 pgs.

\* cited by examiner

US 10,896,534 B1

AVATAR STYLE TRANSFORMATION USING NEURAL NETWORKS

TECHNICAL FIELD

The present disclosure relates generally to style presentations and more particularly to transforming avatar motion styles using neural networks.

BACKGROUND

The popularity of electronic messaging, particularly instant messaging, continues to grow. Users increasingly use "emoji" (which are ideograms and icons) within electronic messages such as texts and emails, reflecting a global demand to communicate more visually. However, conventional emoji and similar graphics are typically generic and lacking in diversity: every individual user is represented by the same set of faces, irrespective of appearance, gender, or ethnicity. Furthermore, every conversation that uses conventional emoji looks identical, and there is no visual personality or cue to identify the participants or distinguish one interaction from the next. Embodiments of the present disclosure address these and other issues.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
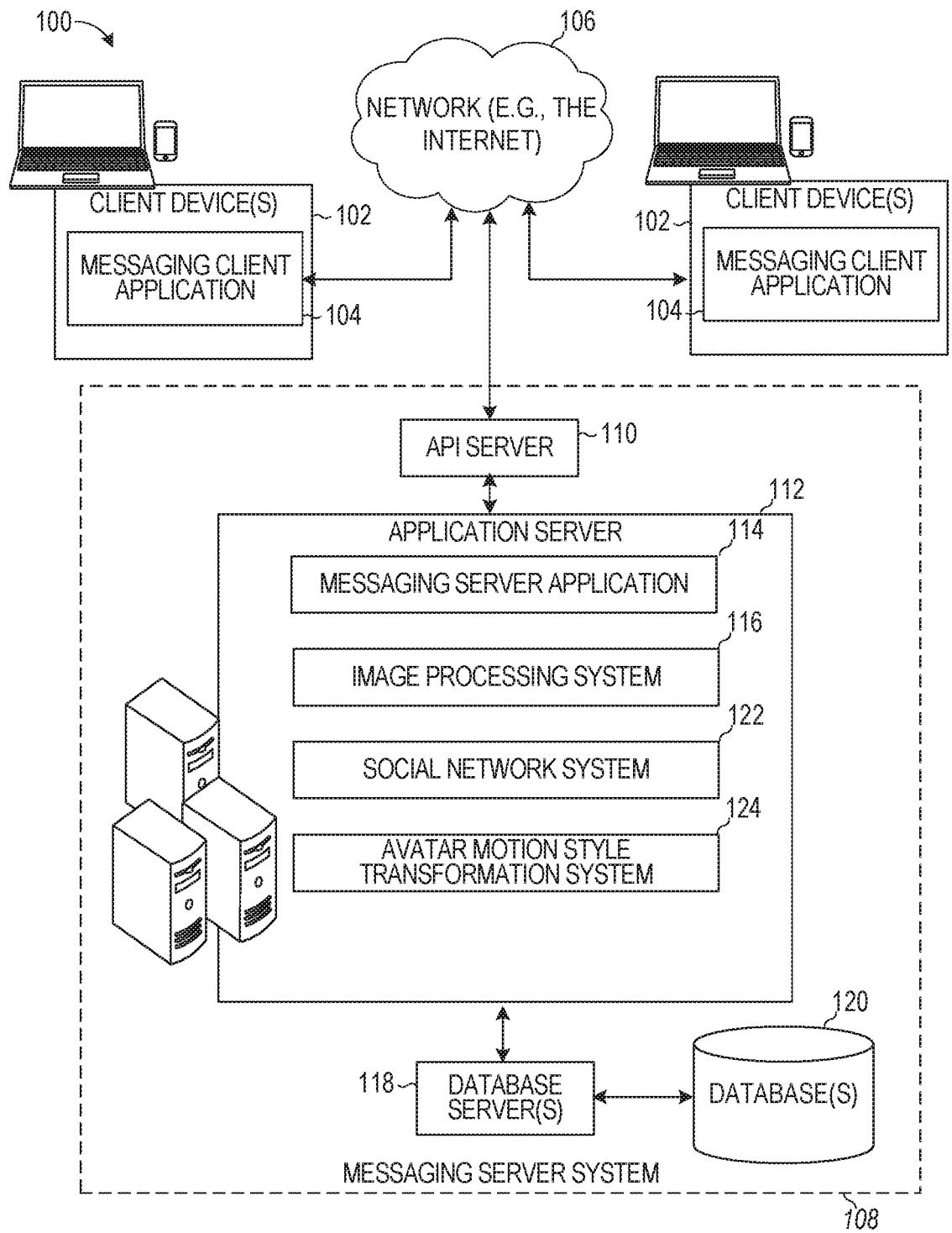
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, the style in which a motion (e.g., walking) is performed is much more expressive and interesting than the motion itself. Choosing the style of motion enables a user to express themselves more fully and results in character and avatar animations that more closely fit the overall sentiment of the user's message. The disclosed embodiments improve the functionality of electronic messaging software and systems by transforming the motion style of a user's selected avatar in real-time to represent the user's sentiment for transmission within electronic messages.

In certain embodiments, various avatars representing a user in a variety of contexts (e.g., playing basketball, being a fan of a team, having a particular set of clothing and accessories) can be stored in the system. These avatars typically represent the user in a neutral motion style or some predetermined motion style. For example, a given avatar can look like it is wearing a given uniform and have a motion and posture that appears proud to be playing basketball (e.g., the avatar may have an upright posture and appear to be walking with a fast pace in the upright posture). In certain cases, though, a user's present sentiment (e.g., mood and style) may not be accurately represented by a given user's selected avatar. In such circumstances, a user can specify a desired style (e.g., depressed) and the system can transform the motion style of the selected avatar to represent the user's sentiment. For example, the user can select the avatar that appears to be wearing a given uniform and proud to be playing basketball and request that the system transform that avatar to appear to be depressed to be playing basketball. In response, the disclosed system can change the posture and walk of the selected avatar from walking fast and upright to walking slowly and hunched over. The user can then compose a message that includes the transformed avatar for transmission to another user.

In certain embodiments, the disclosed system uses a machine learning technique (e.g., an autoencoder neural network) to perform the avatar motion transformation in real-time very quickly and with minimal resources (e.g., low number of iterations, processing power, and storage). Conventional systems store a large motion database (with labels) in device at runtime and given an input motion, for each frame, the conventional systems search example frames of the target style performance in the database. A local linear regression is learned and applied to the input frame to make it look like the target style. The conventional systems not only use a large amount of memory by storing the motion database, they also spend a large amount of runtime in motion searching and the style translations in the conventional systems are restricted to linear transformation. Performing a motion search among the entire motion database slows down motion translation in the conventional systems and prevents the performance of any real-time motion transformation. Through the use of the machine learning techniques and approximation of avatar motion styles, the disclosed system enables the avatar motion transformation to take place on limited resource devices, such as mobile devices, and in real-time. Particularly, the disclosed system uses the motion database to train network models offline, which are capable of performing non-linear style translation in real-time. This avoids the need for a motion database to be used at runtime as only the network models need to be stored on the device rather than the entire motion database. This significantly reduces delays experienced by users who desire to communicate using avatars and improves the overall experience by allowing the user to more quickly create and send messages, featuring an avatar in a selected style, to other users.

Although the described embodiments discuss transforming an avatar motion style using an autoencoder neural network that is trained using a supervised technique that relies on labels in the database, any other machine learning technique or neural network can be used. For example, the avatar motion style can be transformed using any supervised, unsupervised, or semi-supervised reinforcement machine learning technique, including but not limited to a generative-adversarial network, generative network, feedforward neural network, radial basis function neural network. Kohonen self organizing neural network, recurrent neural network, convolutional neural network, deep convolutional neural network, and modular neural network.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; and opening an application event (e.g., relating to the messaging client application 104).

The application server 112 hosts a number of applications and subsystems, including a messaging server application 114, an image processing system 116, a social network system 122, and an avatar motion style transformation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user.

The avatar motion style transformation system 124 implements a machine learning model that transforms, in real-time, an avatar from depicting motion in one style to depicting motion in another style. In some implementations, the avatar motion style transformation system 124 transforms the avatar from depicting motion in one style to depicting motion in multiple styles. In an implementation, the machine learning model of avatar motion style transformation system 124 is an autoencoder neural network that is trained based on a collection of training data that depicts a linear transformation of style of an animated character from one style to another. Specifically, the autoencoder, after being trained, encodes a received input image or video depicting motion in a first style (e.g., general skeletal motion data of an animation made by an artist, with no personal style) and then decodes the input image or video based on a selected style to depict motion in the selected style. Further details of the avatar motion style transformation system 124 are provided below in connection with FIG. 6.

The application server 112 is communicatively coupled to a database server 118, which facilitates access to a database 120 in which is stored data associated with messages processed by the messaging server application 114.

Figure 2:
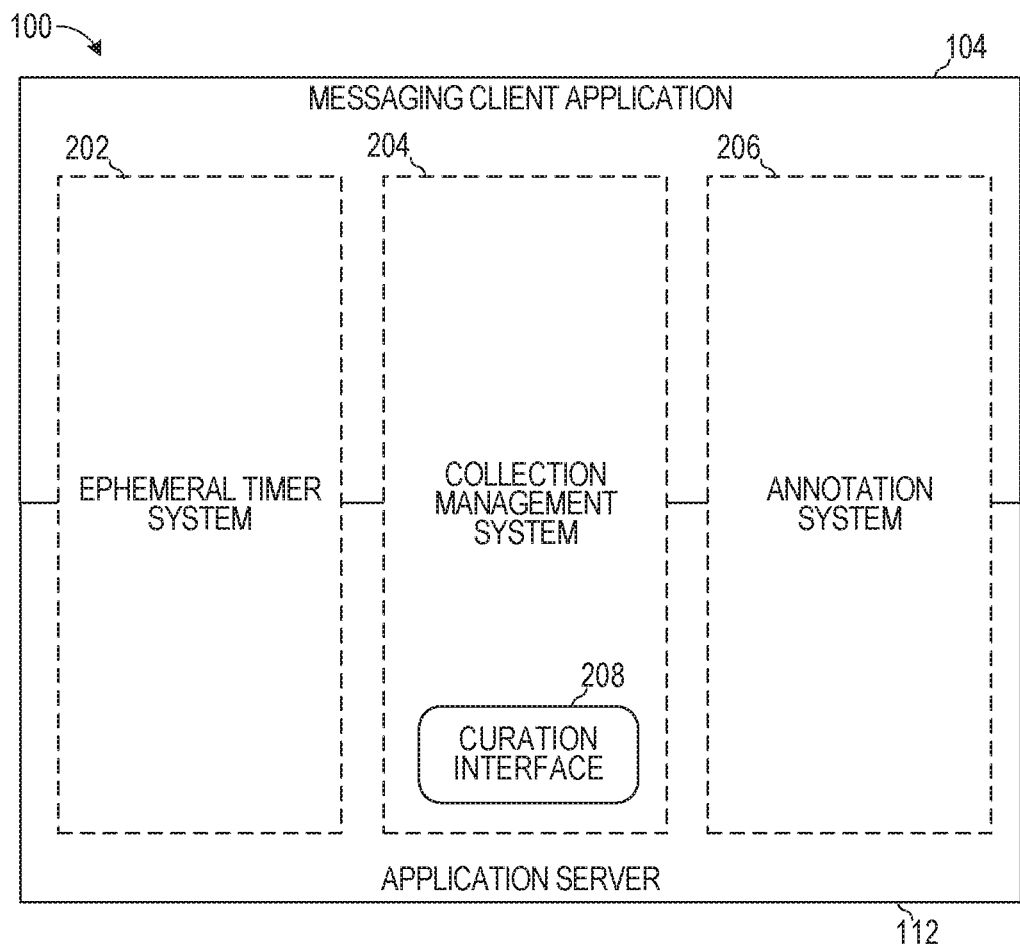
FIG. 2 is a block diagram illustrating further details regarding a messaging system, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, video clips, video clips combined with virtual objects, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the UI of the messaging client application 104.

The collection management system 204 further includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In another embodiment, the annotation system 206 communicates with avatar motion style transformation system 124 to add an avatar depicting motion in a selected style to a message. In an embodiment, a user selects an avatar depicting motion in a first style (e.g., a proud style) and inputs a selection of a desired style (e.g., a depressed style). In some implementations, the user can select a mix or blend of two or more styles (e.g., depressed and old style). The avatar motion style transformation system 124 applies a machine learning model to the selected avatar depicting the first style to transform the avatar to depict the user selected style or blend of styles. After the avatar is transformed, the annotation system 206 enables a user to add the transformed avatar to one or more messages for transmission to one or more other users.

In one example embodiment, the annotation system 206 provides a user-based publication platform that enables users to select a geolocation on a map and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
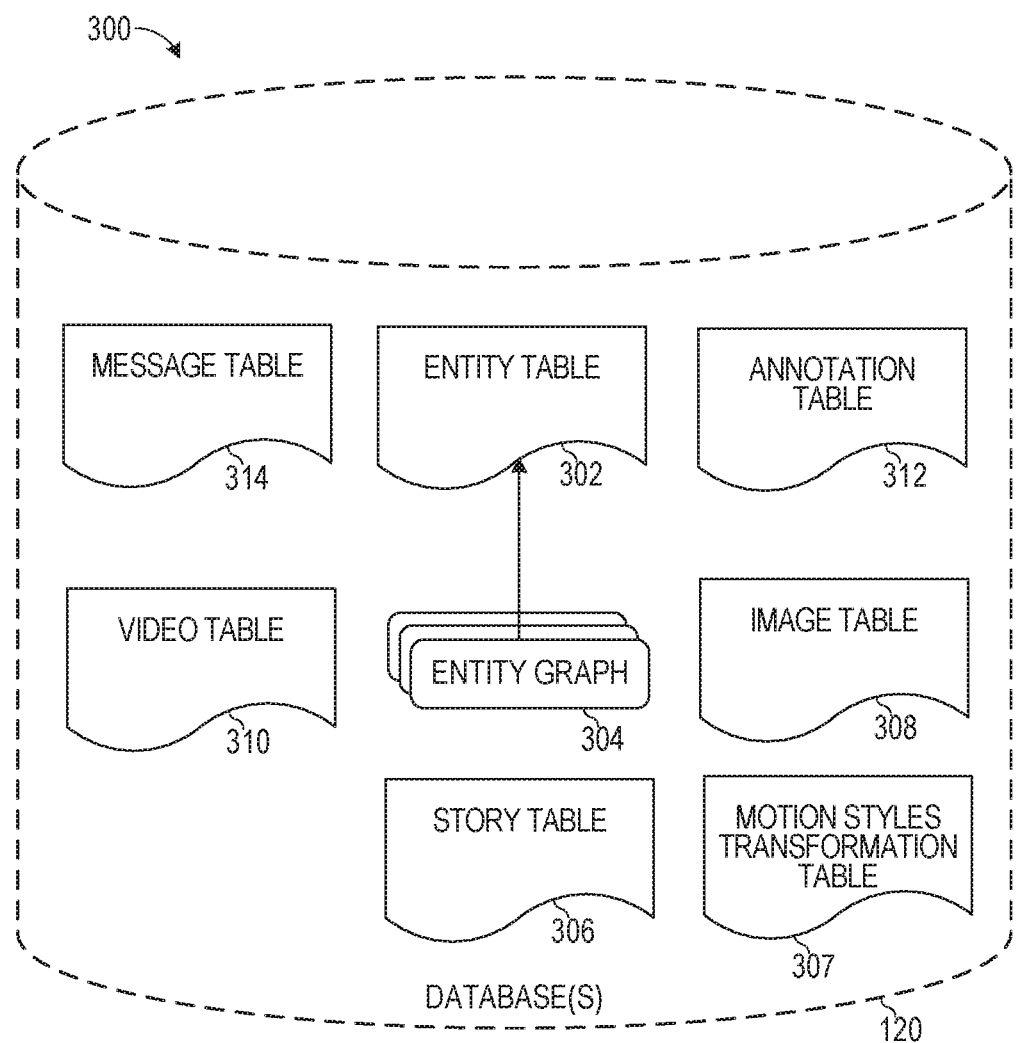
FIG. 3 is a schematic diagram illustrating data which may be stored in the database of the messaging server system, according to example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interest-based, or activity-based, merely for example.

The database 120 also stores annotation data, in the example form of filters, in an annotation table 312. Database 120 also stores annotated content (e.g., avatars transformed from depicting motion in one style to motion in another style and avatars depicting motion in a prespecified style) received from annotation system 206 and/or from avatar motion style transformation system 124 in the annotation table 312. Transformed avatars may also be stored in motion styles transformation table 307. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310. In some cases, video table 310 stores video clips of avatars depicting motion in a style and transformed avatars depicting motion in a user selected style provided by annotation table 312 using avatar motion style transformation system 124.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 104 may include an icon that is user-selectable to enable a sending user to add specific content to his or her personal story. The UI of the messaging client application 104 may include selectable options to enable a sending user to add a modified video clip that has a virtual object to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
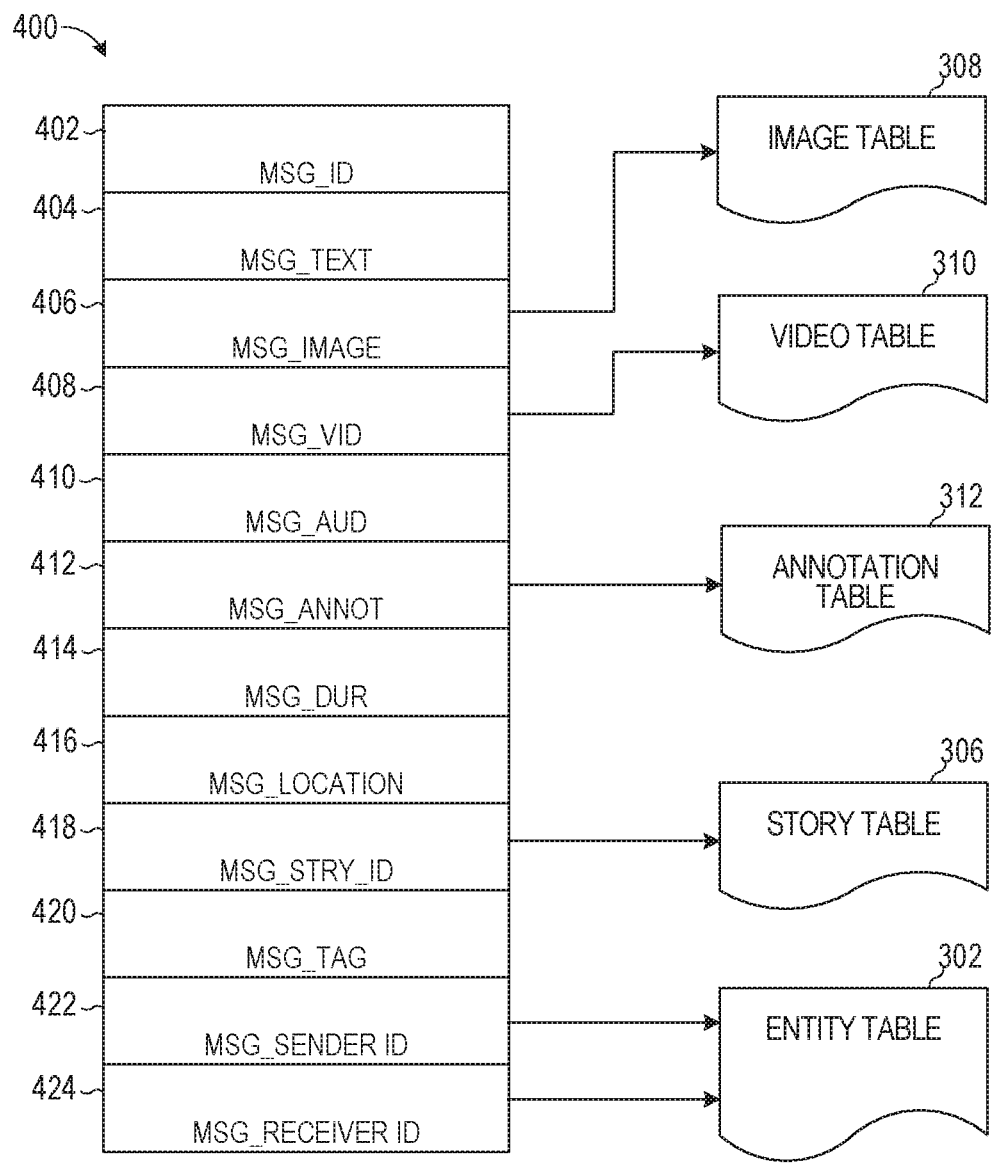
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a UI of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.

- A message audio payload 410: audio data, captured by a microphone or retrieved from the memory component of the client device 102, and that is included in the message 400.
- A message annotations 412: annotation data (e.g., filters, stickers, or other enhancements) that represents annotations to be applied to message image payload 406, message video payload 408, or message audio payload 410 of the message 400. Annotations 412 may include one or more avatars depicting motion in a user selected style. The avatars in annotations 412 may be transformed from depicting motion in one style to motion in another style.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image within the message image payload 406, or a specific video in the message video payload 408).
- A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312 and/or motion styles transformation table 307, values stored within the message story identifier 418 may point to data stored in a story table 306, and values stored within the message sender identifier 422 and the message receiver identifier 424 may point to user records stored within an entity table 302.

Figure 5:
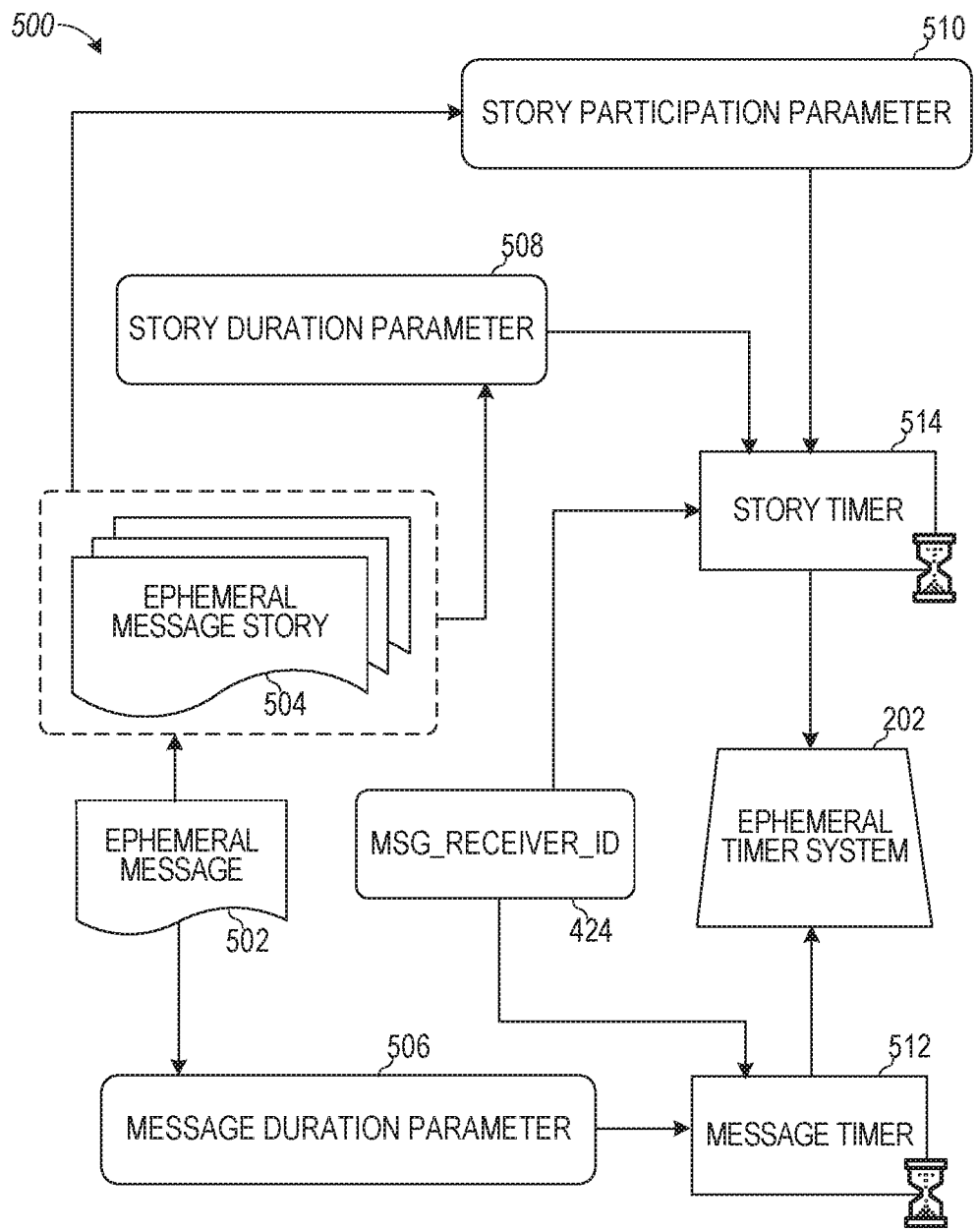
FIG. 5 is a schematic diagram illustrating an example access-limiting process, in terms of which access to content (e.g., an ephemeral message and associated multimedia payload of data) or a content collection (e.g., an ephemeral message story) may be time-limited (e.g., made ephemeral), according to example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provides input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a UI of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Based on a style transformation selected by the user, the system can generate characteristics for avatars that represent the different styles and use such avatar characteristics to generate images containing the avatars of the users. As used herein, an "avatar" of a user is any visual representation of user. The visual representation may be animated (featuring the avatar moving in a particular way by cycling through a 2-3 second clip of the avatar) or may be a single non-moving image. The avatar of a user may be based on images of the user in conjunction with the avatar characteristics identified from the selected styles. Alternatively or additionally, the user may select and customize characteristics of the user's avatar via the user's computing device. Such characteristics may include, for example, the user's bodily features (e.g., muscular, thin, etc.), facial features, clothing and accessories, text displayed in conjunction with the avatar, and images displayed in conjunction with the avatar.

In some embodiments, the generation of images containing avatars may be performed in conjunction with displaying the avatars within a video game. In some cases, the images may be displayed in a single-person game (e.g., played alone by a first user on the first user's computing device) or in a multi-player game (e.g., the game is accessed by the computing device of a first user and the computing device of a second user) played over a network or other connection. During the game, various events may occur and the avatars of one or more users may be modified as a result. For example, an avatar who experiences an injury may be transformed from depicting motion or an image in one style (a neutral style or an action style) to another style (e.g., being depicted as walking with an injury or being in an action style walking with an injury), while an avatar who finds an item in the game (e.g., a sword) can be transformed from depicting motion or an image in an action style into an excited style. In this manner, embodiments of the disclosure allow users to have their own customized avatars (which may be based on their own likenesses and sentiment (featuring motion in a user selected style) appear in video games as well as in other contexts, such as text messages or other electronic communications. As discussed above, avatar motion style transformation system 124 implements a machine learning model that transforms an avatar from depicting motion in one style to depicting motion in another style or styles.

Figure 6:
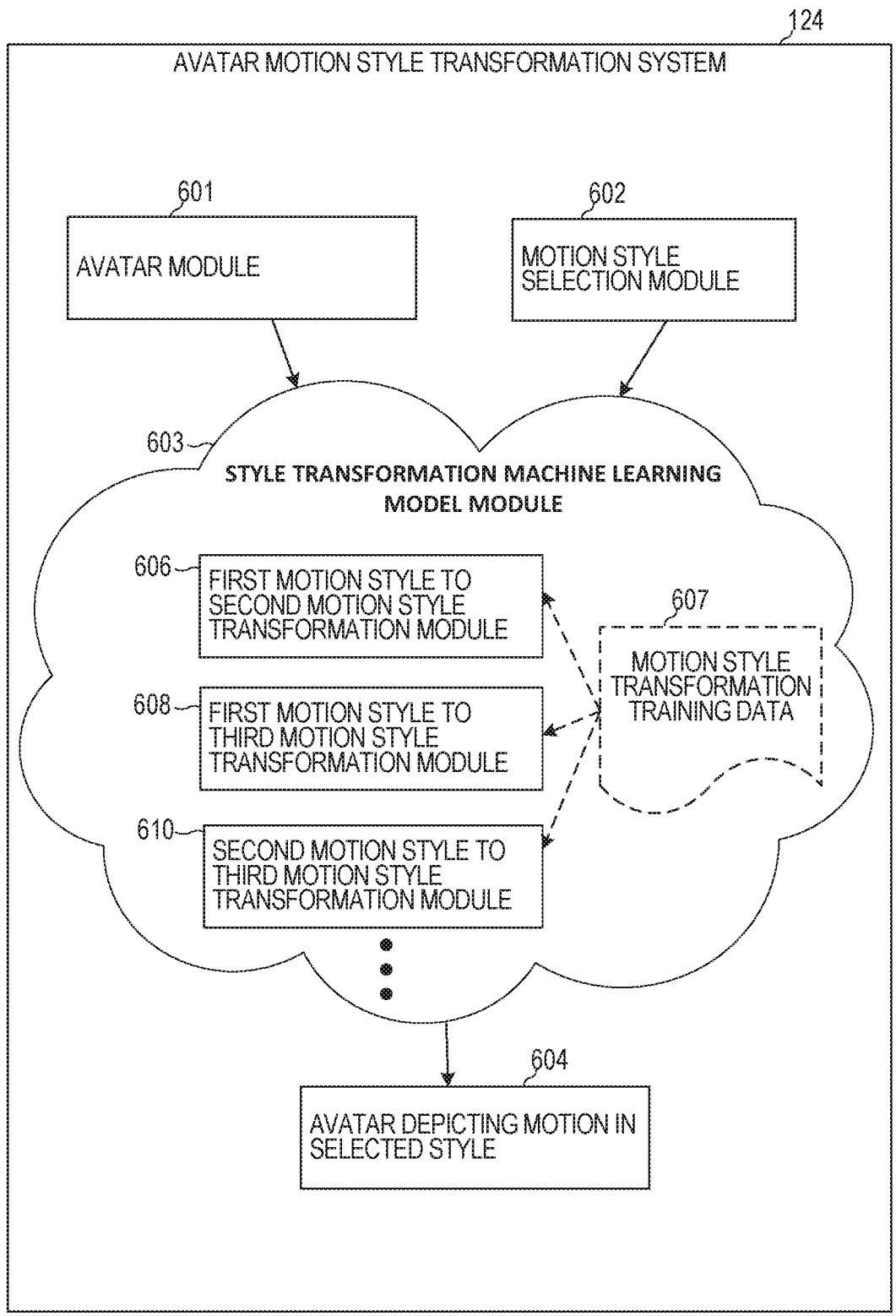
FIG. 6 is a block diagram illustrating various components of an avatar motion style transformation system, according to example embodiments.

FIG. 6 is a block diagram illustrating various components of an avatar motion style transformation system 124, according to example embodiments. Avatar motion style transformation system 124 includes an avatar module 601, a motion style selection module 602, and a style transformation machine learning model module 603.

Avatar module 601 may be responsive to user input selecting an avatar depicting a given style. For example, a user may be presented with a collection of avatars. The collection of avatars may be presented to the user in response to avatar module 601 receiving a given search string and/or based on a region or relationship status of the user to another user to which the user would like to send a message. Each avatar may be associated with metadata indicating a motion style being depicted by the avatar. The user may input a selection of one of the avatars presented in the collection. In response to receiving the user input, the avatar module 601 may retrieve the metadata associated with the selected avatar and determine a motion style being depicted by the selected avatar.

In some embodiments, avatar module 601 may present a previously transformed avatar. For example, after being transformed by style transformation machine learning model module 603, the transformed avatar may be assigned a style (e.g., the style specified by the user). The transformed avatar featuring the previously selected motion style may be selected by the user to further transform the avatar into another style. For example, the user may have previously selected an avatar depicting proud motion to be transformed into an avatar depicting depressed motion. After style transformation machine learning model module 603 performs this transformation, avatar module 601 may present the transformed avatar for the user to select for further transformation. In some implementations, previously transformed avatars may be visually distinguished from avatars depicting motion that has not been previously transformed by the user. As an example, the user may select, from the collection of avatars presented to the user, the avatar depicting the depressed motion and may input a request to transform the avatar to depict a mixture of sexy and old styles. In response, avatar module 601 may provide the previously transformed avatar to style transformation machine learning model module 603, which may also receive the user selection of the mixture of styles. The style transformation machine learning model module 603 may further transform the selected previously transformed avatar from depicting a depressed motion to depicting sexy and old motion styles. In an embodiment, avatar motion may be transformed directly from a neutral motion style to a sexy and old motion style.

The avatar module 601 may provide the selected avatar and an indication of the determined motion style of the avatar to style transformation machine learning model module 603. In an embodiment, after or before selecting the avatar using avatar module 601, motion style selection module 602 may select a desired motion style. In an example, motion style selection module 602 provides a UI to the user through which the user may input a selection of a style. In another example, motion style selection module 602 automatically selects a given style based on a variety of factors (e.g., a user profile, a time of day, and/or an event in a video game) and may provide the automatically selected style to style transformation machine learning model module 603. In the case of user selection of a motion style, motion style selection module 602 may present a list of motion styles. Each motion style in the list may be associated with a checkbox or quantity indicator. To select a style, the user can either check the box of the selected style or may input a quantity of the selected style. The quantity may be used by a user to combine multiple styles in the list (e.g., 30% proud and 70% old). Based on the selections received from the user, the motion style selection module 602 may provide the selected style or combination of styles to style transformation machine learning model module 603.

Style transformation machine learning model module 603 implements one or more machine learning models that are each trained to transform motion style from one style to another style. Once trained, an avatar depicting motion in a default style (e.g., a neutral style) may be received from avatar module 601 and a desired motion may be received from motion style selection module 602. The style transformation machine learning model module 603 selects a given transformation module corresponding to transforming the motion style of the avatar received from avatar module 601 to the motion style received from motion style selection module 602. The style transformation machine learning model module 603 encodes the avatar received from avatar module 601 using the selected transformation module to decode the avatar according to the motion style received from motion style selection module 602. The transformed avatar depicting motion in selected style 604 is then output from the style transformation machine learning model module 603. An avatar depicting motion in selected style 604 may be stored in annotation table 312 or motion styles transformation table 307 to be added to a message.

In an implementation, style transformation machine learning model module 603 includes a first motion style to second motion style transformation module 606, a first motion style to third motion style transformation module 608, and a second motion style to third motion style transformation module 610. During a training phase, each of a first motion style to second motion style transformation module 606, first motion style to third motion style transformation module 608, and second motion style to third motion style transformation module 610 is trained based on motion style transformation training data 607 to transform motion from one style to another style. For example, first motion style to second motion style transformation module 606 may be trained to transform motion depicting a proud style to motion depicting a depressed style. First motion style to third motion style transformation module 608 may be trained to transform motion depicting a proud style to motion depicting an old style. Second motion style to third motion style transformation module 610 may be trained to transform motion depicting a depressed style to motion depicting an old style. Any combination of style transformations may be performed by style transformation machine learning model module 603 by training additional modules. For example, any one of the motion styles including neutral, proud, angry, depressed, strutting, childlike, old, and sexy can be transformed to any other of the styles of neutral, proud, angry, depressed, strutting, childlike, old, and sexy using trained modules in style transformation machine learning model module 603.

Each of first motion style to second motion style transformation module 606, first motion style to third motion style transformation module 608, and second motion style to third motion style transformation module 610 may implement the same or different machine learning model. For the sake of simplicity, the following discussion pertains to first motion style to second motion style transformation module 606, first motion style to third motion style transformation module 608, and second motion style to third motion style transformation module 610 each implementing an autoencoder neural network machine learning model which may be a convolutional autoencoder.

The network provides a forward operation $\Phi$ (encoding) and a backward operation $\Phi^\dagger$ (decoding). The forward operation receives the input vector X in the visible unit space and outputs the encoded values H in the hidden unit space. In some embodiments, the visible unit space includes features of stylized motion including at least one of a motion style, a motion joint position, a motion velocity, a motion pelvis position, or a high level motion feature. In each motion frame, all joint positions can be a 129-dimensional vector. The input data may include joint positions of one motion frame together with its four neighboring frames, which can be a vector of 645 dimension (129×5). The network contains three layers: the first layer is 645 to 128, the second layer is 128 to 64 and the last layer is from hidden units back to the motion frame 64 to 129 (which is a vector of the joint positions of the frame in target style).

The forward operation can be performed in accordance with: $\Phi(X)=\text{ReLU}(\Psi(X*W_0+b_0))$, which consists of a convolution (denoted *) using weights matrix $W_0 \in \mathbb{R}^{m \times d \times w_0}$, addition of a bias $b_0 \in \mathbb{R}^m$, a max pooling operation $\Psi$, and the nonlinear operation $\text{ReLU}(x)=\max(x, 0)$ where $w_0$ is the temporal filter width and m is the number of hidden units in the autoencoding layer.

The max pooling operation $\Psi$ returns the maximum value of each pair of consecutive hidden units on the temporal axis. This reduces the temporal resolution, ensures that the learned bases focus on representative features, and allows the bases to express a degree of temporal invariance. In an implementation, the rectified linear operation ReLU is used instead of the common tanh operation.

The backward operation is performed in accordance with: $\Phi^\dagger(H)=(\Psi^\dagger(H)-b_0)*\tilde{W}_0$, which takes hidden units $$H \in \mathbb{R}^{\frac{n}{2} \times m}$$

as input, and consists of an inverse pooling operation $\Psi^\dagger$, a subtraction of a bias $b_0$, and convolution using the weights matrix $\tilde{W}_0$. $\tilde{W}_0 \in \mathbb{R}^{d \times m \times w_0}$ is simply the weights matrix $W_0$ reflected on the temporal axis, and transposed on the first two axes, used to invert the convolution operation.

When performing the inverse pooling operation, each unit in the hidden layer produces two units in the visible layer (those which were pooled during the forward operation). This operation is therefore non-invertible and an approximation is used. During training, $\Psi^\dagger$ randomly picks between the two corresponding visible units and assigns the complete value to one of those units, leaving the other unit set to zero. This represents a good approximation of the inverse of the maximum operation but introduces noise into the result. Therefore, when performing synthesis, $\Psi^\dagger$ acts like an average pooling operation and spreads the hidden unit value evenly across both visible units.

The network is trained to reproduce some input X following both the forward and backward operations. Training is therefore performed by minimizing a cost function with respect to the parameters of the network, $\theta = \{W_0, b_0\}$: $\text{Cost}(X,\theta) = \|X - \Phi^\dagger(\Phi(X))\|_2^2 + \alpha\|\theta\|_1$. In this equation, the first term measures the squared reproduction error and the second term represents an additional sparsity term that ensures the minimum number of network parameters are used to reproduce the input. This is scaled by some small constant $\alpha$, which may be set to 0.1. In an implementation, the first motion style to second motion style transformation module 606 is trained in accordance with this cost function based on data in motion style transformation training data 607 corresponding to a linear transformation of motion of the first style to motion of the second style. In an example, five consecutive poses from the linear transformation are selected for input to the cost function to train the first motion style to second motion style transformation module 606, though any number of consecutive or non-consecutive poses may be used. Because less than all of the poses in a given linear transformation included in training data 607 are used, the motion transformation is approximated and the first motion style to second motion style transformation module 606 can be trained faster.

Modules 608 and 610 can be trained in a similar manner based on training data 607 corresponding to the transformation performed by the given module. In particular, the first motion style to third motion style transformation module 608 is trained in accordance with the above cost function based on data in motion style transformation training data 607 corresponding to a linear transformation of motion of the first style to motion of the third style. Similarly, the second motion style to third motion style transformation module 610 is trained in accordance with the above cost function based on data in motion style transformation training data 607 corresponding to a linear transformation of motion of the second style to motion of the third style. In some embodiments, the modules 606, 608, and 610 are trained based on features of stylized motion including at least one of a motion style, a motion joint position, a motion velocity, a motion pelvis position, or a high level motion feature.

This cost function is minimized by performing stochastic gradient descent but any other suitable minimization function or operation may be performed. A random elements X is input from the database (e.g., from the motion style transformation training data 607), and using automatic derivatives calculated, the network parameters are updated $\theta$. An adaptive gradient descent algorithm may be used to improve the training speed and quality of the final bases. Once training is complete, the modules in style transformation machine learning model module 603 express strong temporal and inter-joint correspondences and can be applied to transform the motion style of a given avatar.

Any one or more of the components described may be implemented using hardware alone (e.g., one or more of the processors of a machine) or a combination of hardware and software. For example, any component described of the avatar motion style transformation system 124 may physically include an arrangement of one or more processors (e.g., a subset of or among the one or more processors of the machine) configured to perform the operations described herein for that component. As another example, any component of the avatar motion style transformation system 124 may include software, hardware, or both, that configure an arrangement of one or more processors (e.g., among the one or more processors of the machine) to perform the operations described herein for that component. Accordingly, different components of the avatar motion style transformation system 124 may include and configure different arrangements of processors or a single arrangement of processors at different points in time.

Moreover, any two or more components of the avatar motion style transformation system 124 may be combined into a single component, and the functions described herein for a single component may be subdivided among multiple components. Furthermore, according to various example embodiments, components described herein as being implemented within a single machine, database, or device may be distributed across multiple machines, databases, or devices.

Figure 7:
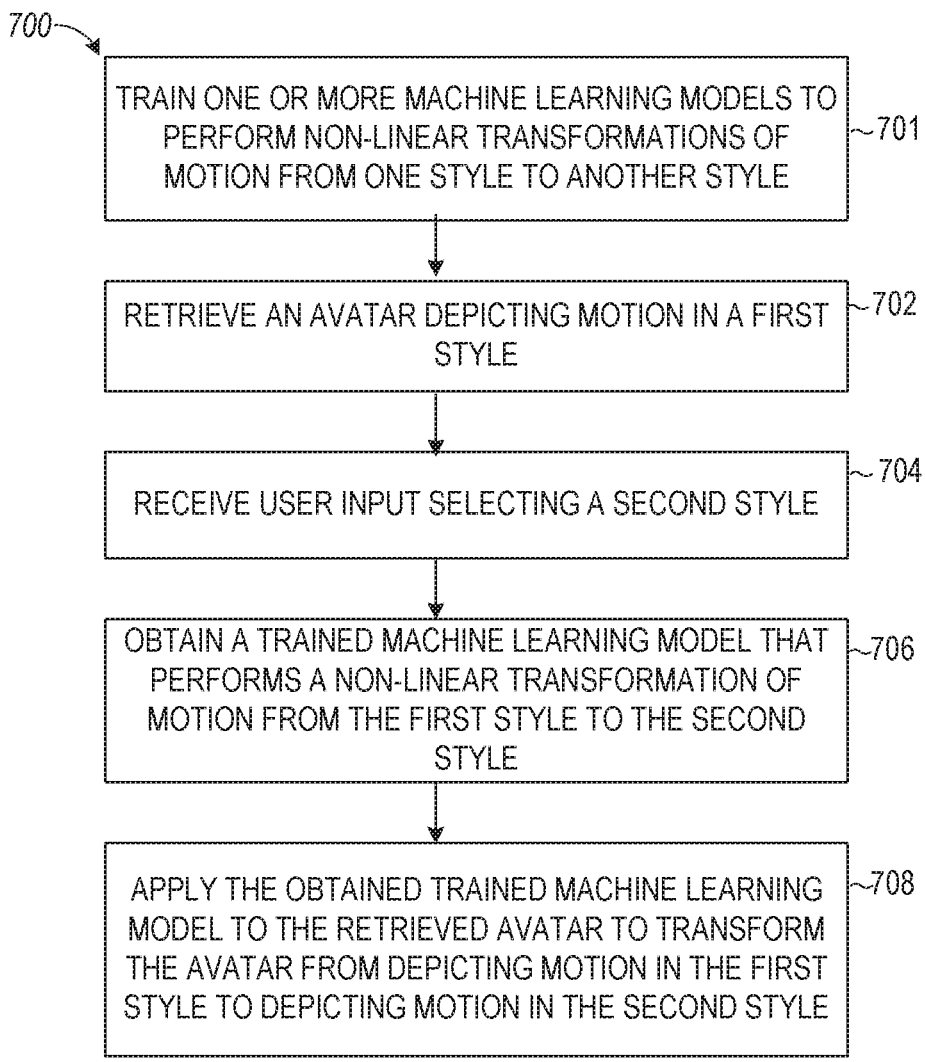
FIGS. 7 and 8 are flowcharts illustrating example operations of the motion style transformation system in performing a process for transforming a style of avatar motion from one style to another, according to example embodiments.

FIG. 7 is a flowchart illustrating example operations of the motion style transformation system in performing a process 700 for transforming style of avatar motion from one style to another, according to example embodiments. The process 700 may be embodied in computer-readable instructions for execution by one or more processors such that the operations of the process 700 may be performed in part or in whole by the functional components of the avatar motion style transformation system 124; accordingly, the process 700 is described below by way of example with reference thereto. However, in other embodiments at least some of the operations of the process 700 may be deployed on various other hardware configurations. The process 700 is therefore not intended to be limited to the avatar motion style transformation system 124. Process 700 may be performed by the avatar motion style transformation system 124 to transform the style of motion depicted by an avatar in real-time from one style to another.

At operation 701, one or more machine learning models are trained to perform non-linear transformations of motion from one style to another style. For example, style transformation machine learning model module 603 may include multiple machine learning model modules (e.g., first motion style to second motion style transformation module 606, first motion style to third motion style transformation module 608, and second motion style to third motion style transformation module 610). As discussed above, each of these modules may implement an autoencoder neural network and is trained using linear transformations of motion styles stored as motion style transformation training data 607.

At operation 702, an avatar depicting motion in a first style is retrieved. For example, avatar module 601 receives a user selection of a given avatar depicting motion in a first style. As an example, a user may select an avatar depicting a proud motion style. Avatar module 601 provides this avatar to style transformation machine learning model module 603.

At operation 704, a user input selecting a second style is received. For example, motion style selection module 602 may receive a user input selecting a given style (e.g., a depressed style). The motion style selected by the user using motion style selection module 602 is provided to style transformation machine learning model module 603.

At operation 706, a trained machine learning model that performs a non-linear transformation of motion from the first style to the second style is obtained. The style transformation machine learning model module 603 determines that the avatar motion is in a first motion style (e.g., a proud motion style) based on the data received from avatar module 601 and may determine that the target style desired by the user is a third motion style (e.g., a depressed motion style). The style transformation machine learning model module 603 may search each of the modules that implement different style transformations to identify the module 608 that performs a transformation from the first motion style (proud motion style) to the third motion style (depressed motion style). The style transformation machine learning model module 603 obtains the cost function that was minimized based on the linear transformation data 607 of proud to depressed motion style. Particularly, style transformation machine learning model module 603 may obtain the coefficients determined for forward and backward operations based on the linear transformation data 607 of proud to depressed motion style.

At operation 708, the obtained trained machine learning model is applied to the retrieved avatar to transform the avatar from depicting motion in the first style to depicting motion in the second style. For example, style transformation machine learning model module 603 may apply the module 608 to the avatar received from avatar module 601 to generate and transform the avatar from depicting the first motion style (a proud motion style) to depicting the third motion style (a depressed motion style). In an embodiment, module 608 may apply the forward operation using the coefficients that were obtained on the avatar received from avatar module 601 and may then apply the reverse operation based on the obtained coefficients to transform the motion style of the avatar.

Figure 8:
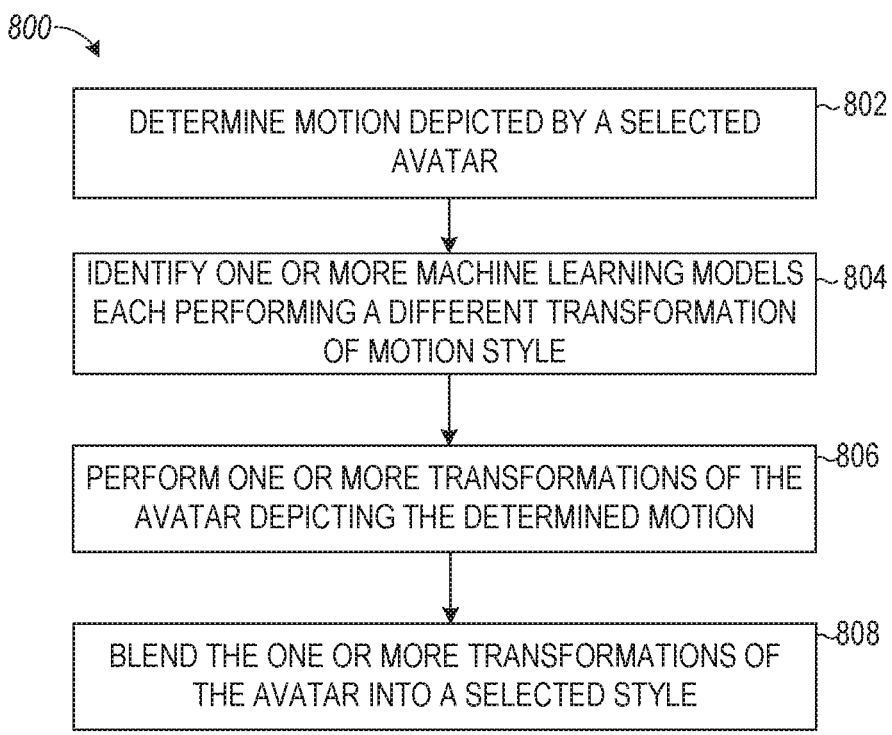

FIG. 8 is a flowchart illustrating example operations of the motion style transformation system in performing a process 800 for transforming a style of avatar motion from one style to another, according to example embodiments. The process 800 may be embodied in computer-readable instructions for execution by one or more processors such that the operations of the process 800 may be performed in part or in whole by the functional components of the avatar motion style transformation system 124; accordingly, the process 800 is described below by way of example with reference thereto. However, in other embodiments at least some of the operations of the process 800 may be deployed on various other hardware configurations. The process 800 is therefore not intended to be limited to the avatar motion style transformation system 124. Process 800 may be performed by the avatar motion style transformation system 124 to transform the style of motion depicted by an avatar in real-time from one style to a combination of other styles.

At operation 802, motion depicted by a selected avatar is determined. For example, avatar module 601 may receive a user selection of an avatar from a collection presented to the user. The avatar module 601 may access metadata associated with the selected avatar to determine the motion style depicted by the selected avatar. The avatar module 601 may provide the selected avatar and data indicating the motion style of the avatar to style transformation machine learning model module 603. For example, avatar module 601 may indicate that the selected avatar depicts a proud motion style. In some embodiments, style transformation machine learning model module 603 may receive a selection of multiple target avatar motion styles from motion style selection module 602. For example, a user may specify a desire to have motion depicted by the avatar corresponding to 30% depressed motion style and 70% old motion style.

At operation 804, one or more machine learning models is identified, each performing a different transformation of motion. For example, style transformation machine learning model module 603 may identify a first module that transforms motion from proud motion style to depressed and a second module that transforms motion from proud motion style to old motion style. Specifically, style transformation machine learning model module 603 may identify as many modules for performing transformations of motion style as mixtures of motions selected by the user. If the user provides input selecting five different mixtures of motion style for transforming a given avatar motion style, style transformation machine learning model module 603 selects five different modules each corresponding to a transformation of motion from the motion style depicted by the selected avatar to each respective one of the five different motion styles identified by the user.

At operation 806, one or more transformations of the avatar depicting the determined motion are performed. For example, each identified module transforms motion depicted by the avatar to the user selected motion. Specifically, one module generates a first intermediate avatar that depicts a depressed motion style by transforming the proud motion style depicted by the avatar to the depressed motion style selected by the user. A second module generates a second intermediate avatar that depicts an old motion style by transforming the proud motion style depicted by the avatar to the old motion style selected by the user.

At operation 808, the one or more transformations of the avatar are blended into a selected style of motion. For example, style transformation machine learning model module 603 may perform a linear interpolation of the first and second intermediate avatars to generate and output an avatar depicting motion corresponding to the user selected mixture of motion styles. Specifically, style transformation machine learning model module 603 may perform a linear interpolation of the first and second intermediate avatars to generate and output an avatar depicting motion that is 30% depressed motion style and 70% old motion style. To do this, style transformation machine learning model module 603 may instruct a linear interpolation module to linearly interpolate 30% of the first avatar with 70% of the second avatar.

Figure 9:
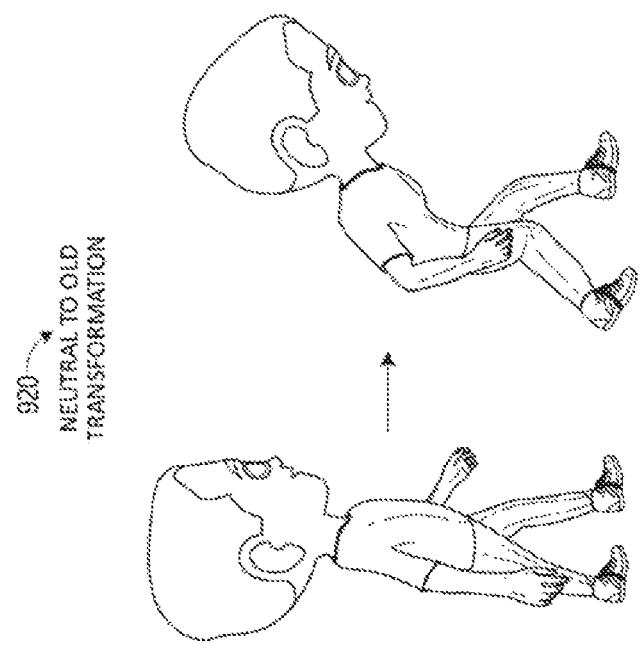
FIG. 9 illustrates diagrams depicting transformation of avatar style using a motion style transformation system, according to example embodiments.
Figure 9:
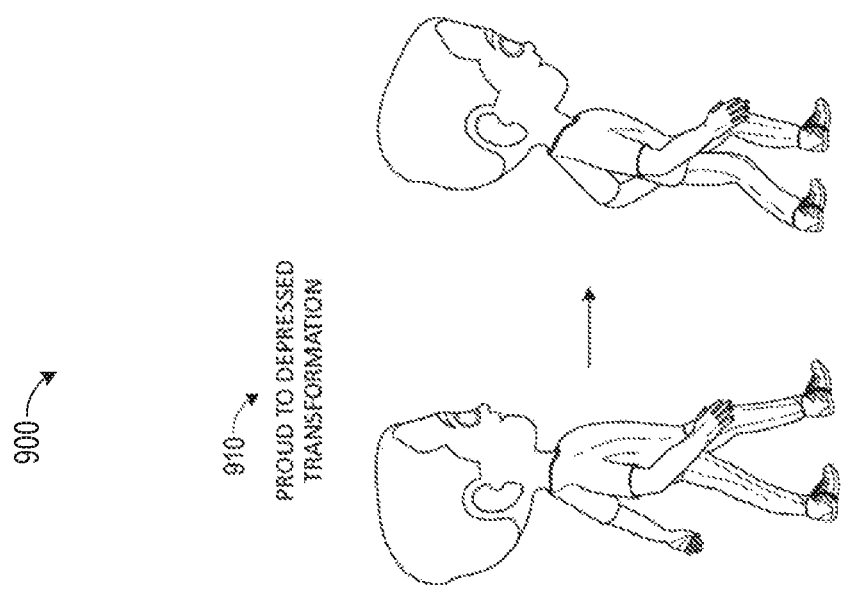

FIG. 9 illustrates diagrams 900 depicting transformation of avatar style using a motion style transformation system, according to example embodiments. For example, transformation 910 may correspond to the transformation of an avatar depicting a proud motion style to an avatar depicting a depressed motion style. The image on the left in transformation 910 represents the output of avatar module 601 (an avatar depicting a proud motion style) selected by a user. A user selection of a depressed motion style may be received. After being processed by style transformation machine learning model module 603, the image on the right in transformation 910 represents the same avatar depicting a depressed motion style.

As another example, transformation 920 may correspond to the transformation of an avatar depicting a neutral motion style to an avatar depicting an old motion style. The image on the left in transformation 920 represents the output of avatar module 601 (an avatar depicting a neutral motion style) selected by a user. A user selection of an old motion style may be received. After being processed by style transformation machine learning model module 603, the image on the right in transformation 920 represents the same avatar depicting an old motion style.

Figure 10:
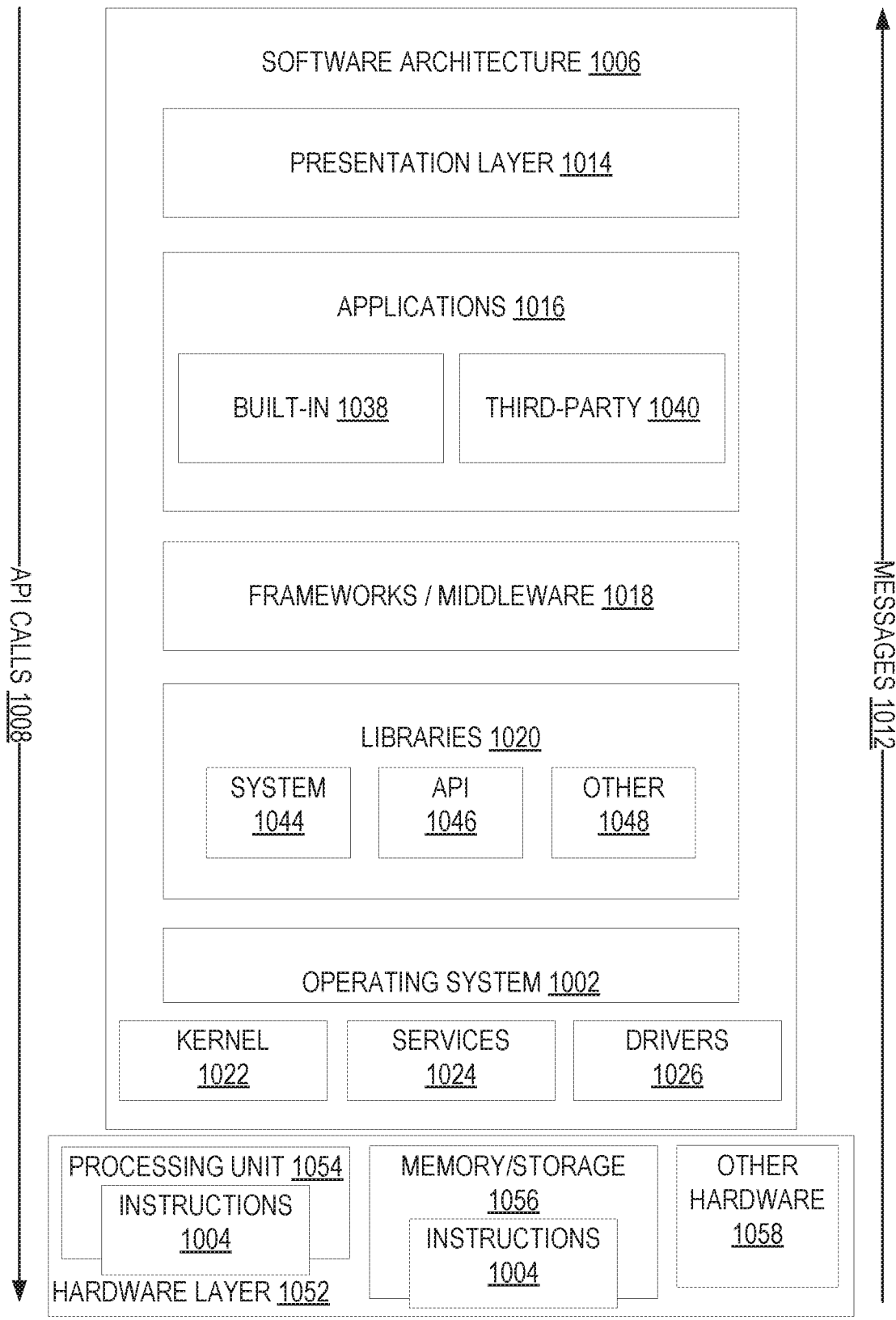
FIG. 10 is a block diagram illustrating a representative software architecture, which may be used in conjunction with various hardware architectures herein described, according to example embodiments.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 1100 of FIG. 11 that includes, among other things, processors 1104, memory 1114, and input/output (I/O) components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components, and so forth described herein. The hardware layer 1052 also includes memory and/or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke API calls 1008 through the software stack and receive messages 1012 in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic UI (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™. ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built-in operating system functions (e.g., kernel 1022, services 1024, and/or drivers 1026), libraries 1020, and frameworks/middleware 1018 to create UIs to interact with users of the system. Alternatively, or additionally, in some systems interactions with a user may occur through a presentation layer, such as presentation layer 1014. In these systems, the application/component "logic" can be separated from the aspects of the application/component that interact with a user.

Figure 11:
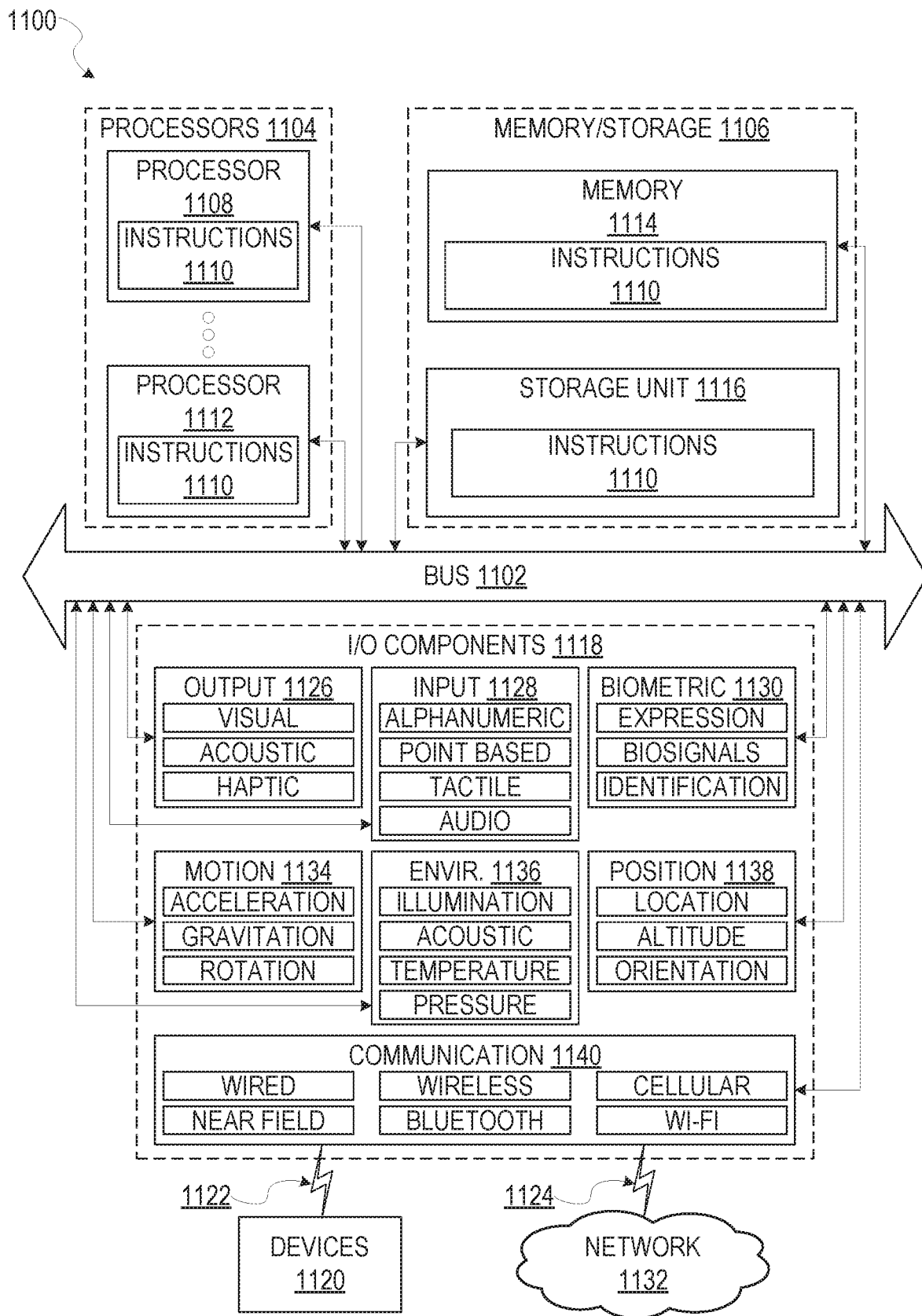
FIG. 11 is a block diagram illustrating components of a machine able to read instructions from a machine-readable medium (e.g., a machine-readable storage medium) and perform any one or more of the methodologies discussed herein, according to example embodiments.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. In an example embodiment, the processors 1104 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1108 and a processor 1112 that may execute the instructions 1110. The term "processor" is intended to include multi-core processors 1104 that may comprise two or more independent processors (sometimes referred to as "cores") that may execute instructions contemporaneously. Although FIG. 11 shows multiple processors 1104, the machine 1100 may include a single processor with a single core, a single processor with multiple cores (e.g., a multi-core processor), multiple processors with a single core, multiple processors with multiple cores, or any combination thereof.

The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1124 and coupling 1122, respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points. APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   retrieving, by a processor from a storage device, an avatar depicting motion in a first style;
   receiving user input selecting a second style;
   obtaining, based on the user input, a first trained machine learning model that performs a non-linear transformation of motion from the first style to the second style, wherein a plurality of trained machine learning models is stored that each performs a different non-linear transformation of motion from one style to another style, and wherein the plurality of stored machine learning models includes at least the first trained machine learning model that performs the non-linear transformation of motion from the first style to the second style and a second trained machine learning model that performs a non-linear transformation of motion from the first style to a third style; and applying the obtained first trained machine learning model to the retrieved avatar to transform the avatar from depicting motion in the first style to depicting motion in the second style.

2. The method of claim 1, wherein at least one of the plurality of trained machine learning models comprises an autoencoder neural network.

3. The method of claim 2, further comprising:
encoding the avatar depicting motion in the first style; and
decoding the avatar depicting motion in the first style according to the second style.

4. The method of claim 1, wherein the avatar represents a first user, further comprising generating an ephemeral message that includes the avatar depicting motion in the second style for transmission to a second user.

5. The method of claim 1, further comprising:
storing a database of training motions, the training motions represent linear transformations of pose-by-pose motions from the first style to the second style; and
training the first machine learning model based on the motions stored in the database by generating joint positions of a single stylized pose based on joint positions of each of a subset of the plurality of the training motions.

6. The method of claim 1, further comprising selecting the first trained machine learning model from the plurality of machine learning models based on a determination of the first style of the avatar and the second style selected by the received user input.

7. The method of claim 1, wherein receiving the user input comprises:
receiving a first user input specifying a first amount of a fourth style;
receiving a second user input specifying a second amount of a fifth style; and
generating the second style as a combination of the first amount of the fourth style and the second amount of the fifth style.

8. The method of claim 7, further comprising:
obtaining a third trained machine learning model that performs a first non-linear transformation of motion from the first style to the fourth style; and
obtaining a fourth trained machine learning model that performs a second non-linear transformation of motion from the first style to the fifth style.

9. The method of claim 8, further comprising:
generating a first intermediate avatar by applying the third trained machine learning model to the retrieved avatar to transform the avatar from depicting motion in the first style to depicting motion in the fourth style; and
generating a second intermediate avatar by applying the fourth trained machine learning model to the retrieved avatar to transform the avatar from depicting motion in the first style to depicting motion in the fifth style.

10. The method of claim 9, further comprising blending the first and second intermediate avatars to generate the avatar depicting motion in the second style.

11. The method of claim 10, wherein blending comprises linearly interpolating the first and second intermediate avatars.

12. The method of claim 1, further comprising training the first machine learning model based on a plurality of features of stylized motion including at least one of a motion style, a motion joint position, a motion velocity, a motion pelvis position, or a high level motion feature.

13. The method of claim 1, further comprising storing the first trained machine learning model on a mobile device, wherein the receiving, the obtaining, and the applying steps are performed by the mobile device.

14. The method of claim 1, further comprising receiving a user selection of the avatar from a plurality of avatars each depicting motion in a different style.

15. Storing the transformed avatar depicting motion in the second style; and transforming, using another trained machine learning model, the transformed avatar from depicting motion in the second style to depicting motion in another style.

16. A system comprising:
a processor configured to:
retrieve, from a storage device, an avatar depicting motion in a first style;
receive user input selecting a second style;
obtain, based on the user input, a first trained machine learning model that performs a non-linear transformation of motion from the first style to the second style, wherein a plurality of trained machine learning models is stored that each performs a different non-linear transformation of motion from one style to another style, and wherein the plurality of stored machine learning models includes at least the first trained machine learning model that performs the non-linear transformation of motion from the first style to the second style and a second trained machine learning model that performs a non-linear transformation of motion from the first style to a third style; and
apply the obtained first trained machine learning model to the retrieved avatar to transform the avatar from depicting motion in the first style to depicting motion in the second style.

17. The system of claim 16, wherein the processor is further configured to:
receive a first user input specifying a first amount of a fourth style;
received a second user input specifying a second amount of fifth style; and
generate the second style as a combination of the first amount the fourth style and the second amount of the fifth style.

18. A non-transitory machine-readable storage medium that includes instructions that, when executed by one or more processors of a machine, cause the machine to perform operations comprising:
retrieving, by one of the processors from a storage device, an avatar depicting motion in a first style;
receiving user input selecting a second style;
obtaining, based on the user input, a first trained machine learning model that performs a non-linear transformation of motion from the first style to the second style, wherein a plurality of trained machine learning models is stored that each performs a different non-linear transformation of motion from one style to another style, and wherein the plurality of stored machine learning models includes at least the first trained machine learning model that performs the non-linear transformation of motion from the first style to the second style and a second trained machine learning model that performs a non-linear transformation of motion from the first style to a third style; and
applying the obtained first trained machine learning model to the retrieved avatar to transform the avatar from depicting motion in the first style to depicting motion in the second style.

19. The non-transitory machine-readable medium of claim 18, wherein the operations further comprise:
- receiving a first user input specifying a first amount of a fourth style;
- receiving a second user input specifying a second amount of a fifth style; and
- generating the second style as a combination of the first amount the fourth style and the second amount of the fifth style.

* * * * *

UNITED STATES PATENT AND TRADEMARK OFFICE
CERTIFICATE OF CORRECTION

Page 1 of 1

PATENT NO.         : 10,896,534 B1
APPLICATION NO.    : 16/135911
DATED              : January 19, 2021
INVENTOR(S)        : Smith et al.

It is certified that error appears in the above-identified patent and that said Letters Patent is hereby corrected as shown below:

In the Claims

In Column 28, Line 40, in Claim 17, after "of", insert --a--

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*